(12) United States Patent
Castro Pena

(10) Patent No.: US 10,870,155 B2
(45) Date of Patent: Dec. 22, 2020

(54) OSCILLATING TOOL ACCESSORY HOLDER MECHANISM

(71) Applicants: Robert Bosch Tool Corporation, Broadview, IL (US); Robert Bosch GmbH, Stuttgart (DE)

(72) Inventor: Said S. Castro Pena, Thermal, CA (US)

(73) Assignees: Robert Bosch Tool Corporation, Broadview, IL (US); Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/893,610

(22) Filed: Feb. 10, 2018

(65) Prior Publication Data

US 2019/0247933 A1    Aug. 15, 2019

(51) Int. Cl.
*B23B 31/19*      (2006.01)
*B23B 31/40*      (2006.01)
*B27B 19/00*      (2006.01)
*B24B 23/04*      (2006.01)

(52) U.S. Cl.
CPC .......... *B23B 31/19* (2013.01); *B23B 31/4073* (2013.01); *B27B 19/006* (2013.01); *B24B 23/04* (2013.01); *Y10T 279/33* (2015.01)

(58) Field of Classification Search
CPC ..... B23B 31/10; B23B 31/19; B23B 31/4073; B23D 61/006; B24B 23/02; B24B 23/04; B24B 45/006; B27B 19/006; B27B 5/30; Y10T 279/33
See application file for complete search history.

(56) References Cited

U.S. PATENT DOCUMENTS

| | | | | |
|---|---|---|---|---|
| 4,779,382 A * | 10/1988 | Rudolf | .................. | B24B 45/006 451/342 |
| 5,489,285 A * | 2/1996 | Goris | ..................... | B23D 51/10 606/176 |
| 5,729,904 A * | 3/1998 | Trott | ...................... | B23D 51/10 30/339 |
| 7,344,435 B2 * | 3/2008 | Pollak | ................... | B24B 45/006 451/342 |
| 7,833,241 B2 * | 11/2010 | Gant | .................. | A61B 17/1637 30/339 |
| 7,997,586 B2 | 8/2011 | Ziegler et al. | | |
| 9,486,909 B2 * | 11/2016 | Zieger | ................... | B24B 23/022 |
| 10,099,341 B2 * | 10/2018 | Aoki | ..................... | B24B 45/006 |
| 2014/0327215 A1 * | 11/2014 | Thorson | ............. | B23B 31/4073 279/141 |

* cited by examiner

*Primary Examiner* — Eric A. Gates
*Assistant Examiner* — Chwen-Wei Su
(74) *Attorney, Agent, or Firm* — Maginot, Moore & Beck LLP

(57) ABSTRACT

An oscillating power tool system in one embodiment includes a motor, an output power shaft extending along an axis and operably connected to the motor, the output power shaft driven in an oscillatory manner by the motor about the axis, a flange supported by the output power shaft and fixedly positioned with respect to the output power shaft so as to oscillate with the output power shaft when driven by the motor, the flange including a lower surface defining a first plane, and a plurality of mounting pins extending from the flange to a location beneath the first plane, the plurality of mounting pins configured such that when an accessory is mounted to the flange, a mounting force is applied directly to the plurality of mounting pins from the accessory.

14 Claims, 4 Drawing Sheets

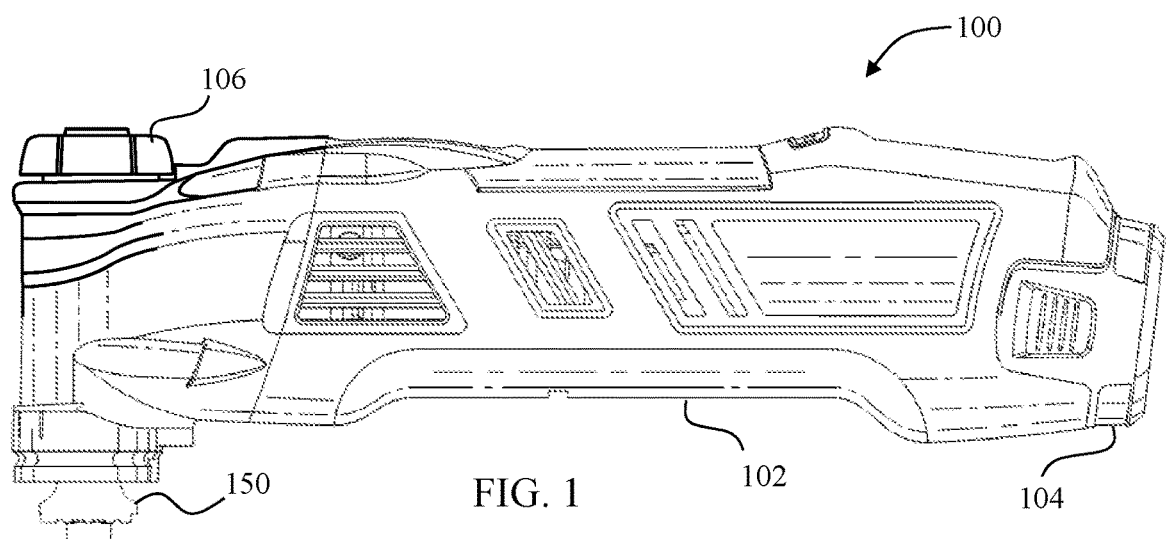
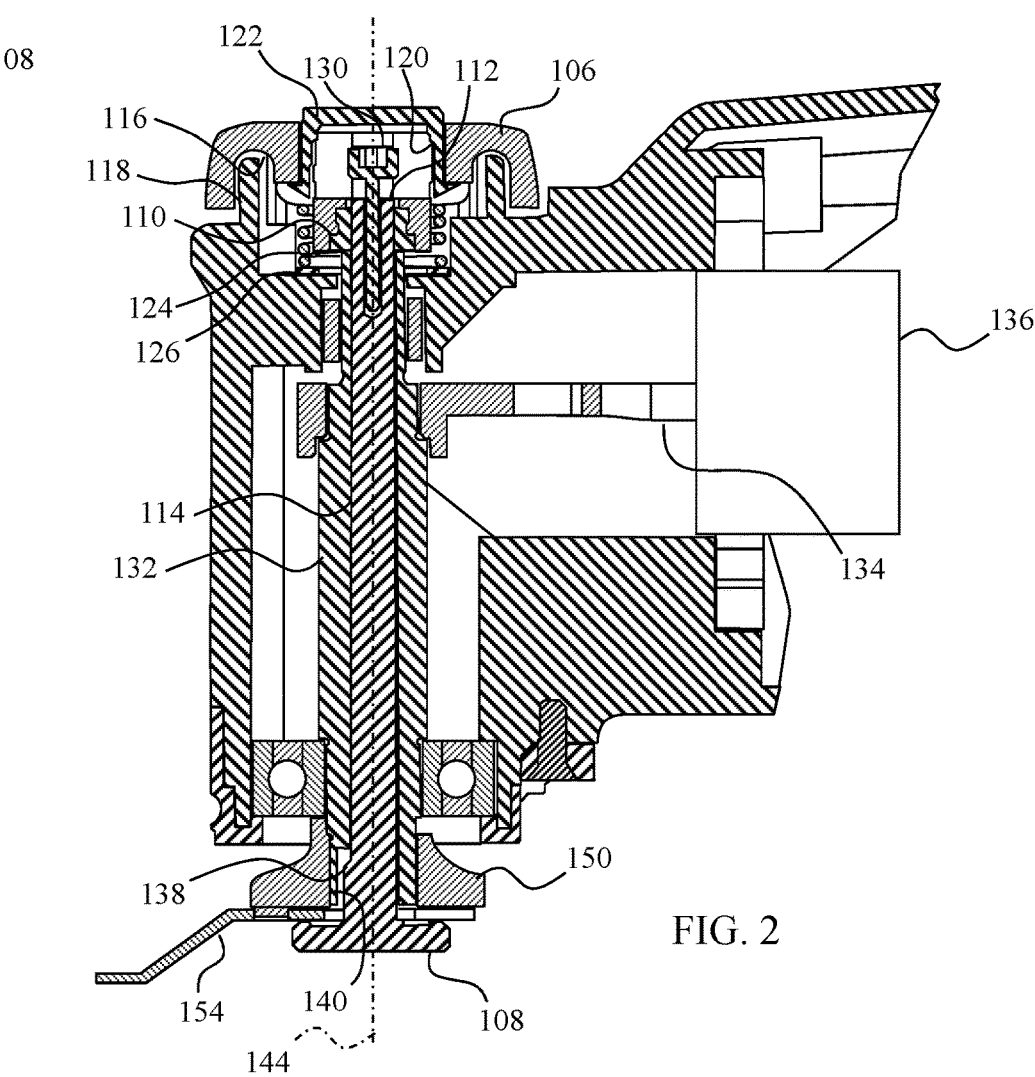

OSCILLATING TOOL ACCESSORY HOLDER MECHANISM

FIELD

This disclosure relates to the field of oscillating power tools, and more particularly to oscillating power tools with removable accessories.

BACKGROUND

In general, oscillating tools are light-weight, handheld power tools capable of being equipped with a variety of tool accessories and attachments, such as cutting blades, sanding discs, grinding tools, and many others. These types of tools typically include a generally cylindrically-shaped main body that serves as an enclosure for an electric motor as well as a hand grip for the tool. The electric motor oscillates a tool holder to which any one of various accessory tools may be attached. As the tool holder is oscillated, an accessory tool attached to the tool holder is driven to perform a particular function, such as sanding, grinding, cutting, etc. depending on the configuration of the accessory tool.

Accessory tools for an oscillating power tool typically have one-piece rigid construction that includes a mounting portion that is used to secure the accessory tool to the tool holder and a tool body extending from the mounting portion that supports a working portion of the accessory tool, such as an abrasive surface or sharp edge. The tool holder of most oscillating power tools includes a tool drive structure that facilitates a secure and rigid connection between the tool holder and the mounting portion of one or more accessory tools. The accessory tools for use with a power tool are provided with an accessory drive structure configured to interlock with the tool drive structure of the corresponding tool holder. The interlocked drive structures enable the accessory tool to be moved with the tool holder while preventing slippage and other relative movement of the accessory tool with respect to the tool holder as the tool holder is oscillated.

While effective, the known interlock drive structures on oscillating tools are typically complex and expensive. The complexity and size of the interlock drive structures is driven by the need exert a sufficiently large force to prevent slippage of the accessory tool as the accessory tool is engaged with a work piece and driven with the oscillatory movement. At the same time, the device that creates this force must be decoupled from the oscillating mechanism due to the configuration of the mechanism. By way of example, U.S. Pat. No. 7,997,586 which issued on Aug. 16, 2011 discloses a lever mechanism which provides a quick-change capability. It would not be suitable for the lever mechanism to oscillate with the output shaft since the lever is so large.

What is needed is an accessory holding mechanism for an oscillatory power tool which can be operated without tools while providing a quick exchange of accessories. It would be beneficial if such an accessory holding mechanism exhibited reduced complexity compared to known devices. It would be further beneficial if such an accessory holding mechanism were less expensive than more complex systems.

SUMMARY

In accordance with one embodiment, an oscillating power tool system includes a motor, an output power shaft extending along an axis and operably connected to the motor, the output power shaft driven in an oscillatory manner by the motor about the axis, a flange supported by the output power shaft and fixedly positioned with respect to the output power shaft so as to oscillate with the output power shaft when driven by the motor, the flange including a lower surface defining a first plane, and a plurality of mounting pins extending from the flange to a location beneath the first plane, the plurality of mounting pins configured such that when an accessory is mounted to the flange, a mounting force is applied directly to the plurality of mounting pins from the accessory.

In one or more embodiments, the plurality of mounting pins include a first mounting pin, the first mounting pin includes at least one mounting wall portion extending between an upper transition portion and a lower transition portion, at least a portion of the first mounting pin extends within a receptacle of the accessory when the accessory is mounted to the flange, and the first mounting pin is configured such that the at least one mounting wall portion contacts a wall of the receptacle of the accessory when the accessory is mounted to the flange.

In one or more of the above embodiments, the at least one mounting wall portion includes a first mounting wall portion on a first side of the first mounting pin, the at least one mounting wall portion includes a second mounting wall portion on a second side of the first mounting pin, the first side is directly opposite the second side, the first side contacts a first portion of the wall of the receptacle of the accessory when the accessory is mounted to the flange, and the second side contacts a second portion of the wall of the receptacle of the accessory when the accessory is mounted to the flange.

In one or more of the above embodiments, the oscillating power system further includes a spindle axially slideably positioned within a central bore of the output power shaft, a foot portion extending orthogonally to the axis and configured to clamp the accessory against the plurality of mounting pins when the accessory is mounted to the flange, and a clamping mechanism configured to selectively force the foot portion against the accessory.

In one or more of the above embodiments, the spindle includes an externally threaded extension extending upwardly and outwardly from the central bore, and the clamping mechanism includes an internally threaded portion threadedly engaged with the externally threaded extension, the clamping mechanism configured to apply an upward force on the spindle along the axis so as to force the foot against the accessory with a mounting force when the accessory is mounted to the flange.

In one or more of the above embodiments, the internally threaded portion is a portion of a knob, the knob is movable between a first position with respect to the spindle and a second position with respect to the spindle, the knob is spaced apart from the foot by a first distance when the knob is in the first position, the knob is spaced apart from the foot by a second distance when the knob is in the second position, and the second distance is greater than the first distance.

In one or more of the above embodiments, the oscillating power system further includes a spring configured to bias the knob in a direction away from the foot.

In one or more of the above embodiments the power tool system is configured such that when the knob is in the second position, the knob can be forced downwardly along the axis while in the second position, thereby moving the foot away from the flange.

In one or more of the above embodiments the internally threaded portion is a portion of a metal insert, the metal insert contacts the output power shaft when the knob is in the first position, and the metal insert does not contact the output power shaft when the knob is in the second position and the knob is not being forced downwardly.

In one or more of the above embodiments, the accessory is a part of the oscillating power tool system.

In a further embodiment, a method of mounting an accessory to an oscillating power tool includes positioning a planar mounting portion of an accessory between a foot of a spindle and a flange supported by an output power shaft which extends along an axis and is operably connected to a motor, the output power shaft driven in an oscillatory manner by the motor, contacting a plurality of mounting pins extending from the flange to a location beneath a first plane defined by a lower surface of the flange with the planar mounting portion of the accessory, and applying a first force to the planar mounting portion with the foot with the plurality of mounting pins contacting the planar mounting portion such that a mounting force is applied from the planar mounting portion to the plurality of mounting pins.

In one or more of the above, contacting the plurality of mounting pins includes contacting a wall of the receptacle of the accessory with at least one mounting wall portion of one of the plurality of mounting pins, the mounting wall portion extending between an upper transition portion of the one of the plurality of mounting pins and a lower transition portion of the one of the plurality of mounting pins.

In one or more of the above, contacting the wall of the receptacle includes contacting a first portion of the wall of the receptacle with a first of the at least one mounting wall portions, and contacting a second portion of the wall of the receptacle with a second of the at least one mounting wall portions, wherein the first mounting wall portion is on a first side of the one of the plurality of mounting pins, the second mounting wall portion is on a second side of the one of the plurality of mounting pins, and the first side is directly opposite the second side.

In one or more of the above, a method includes forcing the spindle downwardly along an axis thereby moving the foot away from the flange prior to positioning the planar mounting portion of the accessory between the foot and the flange.

In one or more of the above, a knob is in a first position with respect to the spindle and threadedly engaged with the spindle while forcing the spindle downwardly, applying the mounting force comprises rotating the knob with respect to the spindle to move the knob to a second position with respect to the spindle, the knob is spaced apart from the foot by a first distance when the knob is in the first position, the knob is spaced apart from the foot by a second distance when the knob is in the second position, and the first distance is greater than the second distance.

In one or more of the above, applying the mounting force includes contacting an upper surface of the power output shaft with a metal insert in the knob.

In one or more of the above, a method includes biasing the knob in a direction away from the foot with a spring while forcing the spindle downwardly along the axis.

BRIEF DESCRIPTION OF THE DRAWINGS

FIG. 1 depicts a side plan view of an oscillating power tool;
FIG. 2 depicts a partial side cross-sectional view of the oscillating power tool of FIG. 1 with an accessory held by application of a mounting force to mounting pins of the oscillating power tool, and with a knob positioned distally on a threaded extension of the spindle.

DESCRIPTION

Figure 3:
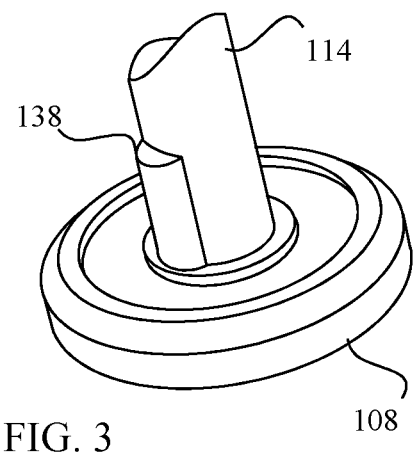
FIG. 3 depicts a partial perspective view of the spindle of the oscillating power tool of FIG. 1 showing an anti-rotation feature.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

FIG. 1 depicts an oscillating power tool 100 that includes a housing 102 which, in this embodiment, receives a rechargeable battery 104. In some embodiments, power is provided by a wired connection. The housing 102 is configured as a hand grip so as to be held by a user. A knob 106 extends outwardly from the housing 102.

The knob 106 is operably connected to a foot 108 which extends outwardly from the housing 102 on a side of the housing 102 opposite to the side from which the knob 106 extends. As shown in FIG. 2, the knob 106 includes an internally threaded metallic insert 110 which is threadedly engaged with an externally threaded extension 112 of a spindle 114 which includes the foot 108. The knob 106 further includes a circular channel 116 which receives an annular protuberance 118 of the housing. In some embodiments, the circular channel 116 and the annular protuberance 118 are omitted. A central chamber 120 of the knob 106 is covered by a cap 122. A spring 124 is positioned between the knob 106 and a washer 126 positioned on the housing 102.

Figure 4:
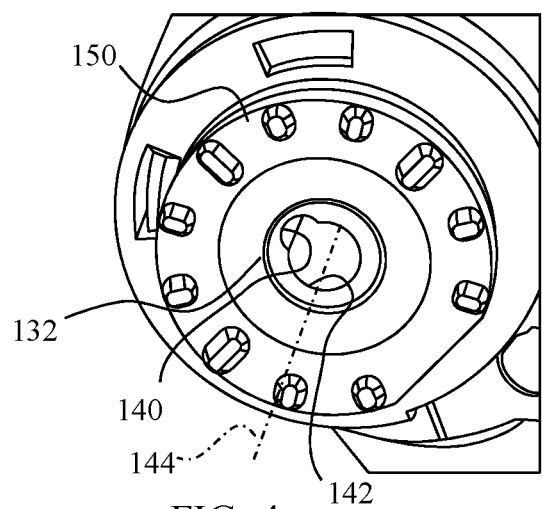
FIG. 4 depicts a partial bottom perspective view of the flange of the oscillating power tool of FIG. 1.

Within the chamber 120 a screw 130 extends outwardly from the externally threaded extension 112 of the spindle 114. The screw 130 is fixedly positioned within the externally threaded extension 112 so as to rotate with the spindle 114. The spindle 114 is axially slideably positioned within an output power shaft 132 which is driven in an oscillatory manner by a power shaft 134 which is driven by a motor 136. The spindle 114 is rotationally fixed with respect to the output power shaft 132 by an anti-rotation protuberance 138 which is received within an anti-rotation channel 140 of the output power shaft 132. The anti-rotation protuberance 138 and anti-rotation channel 140 are also shown in FIGS. 3 and 4, respectively. The anti-rotation channel 140 extends outwardly from a central bore 142 of the output power shaft 132 which is centered on an axis of rotation 144. The longitudinal axes of the output power shaft 132 and the spindle 144 are collinear with the axis 144.

Figure 5:
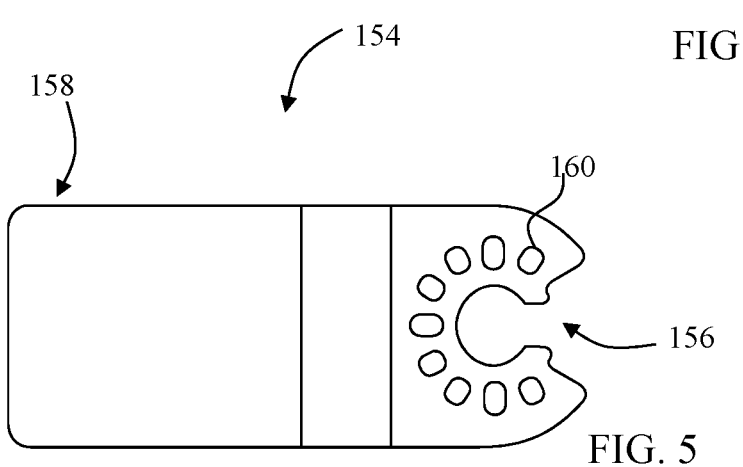
FIG. 5 depicts a top plan view of an accessory that can be mounted to the oscillating power tool of FIG. 1.

FIGS. 2 and 4 show a flange 150 which is fixedly connected to the output power shaft 132 so as to oscillate with the output power shaft 132. The flange is part of the drive structure of the oscillating power tool 100. The flange 150 includes a number of mounting pins 152 which in the embodiment depicted in FIG. 4 include some mounting pins which are shaped differently (i.e., longer) than other mounting pins. In some embodiments, all of the mounting pins 152 are shaped identically. The mounting pins 152 are used to mount an accessory such as the accessory 154 of FIG. 5 onto the oscillating power tool 100.

The accessory 154 includes a mounting portion 156 and a working portion 158 which in this embodiment is configured as an edge. In other embodiments, the working portion is configured as a saw, knife, or any other desired configuration. The mounting portion 156 includes a number of receptacles 160 which in this embodiment extend completely through the accessory 154. In other embodiments, some or all of the receptacles extend only partially through the accessory 154. The receptacles are part of the drive structure for the accessory 154.

Figure 6:
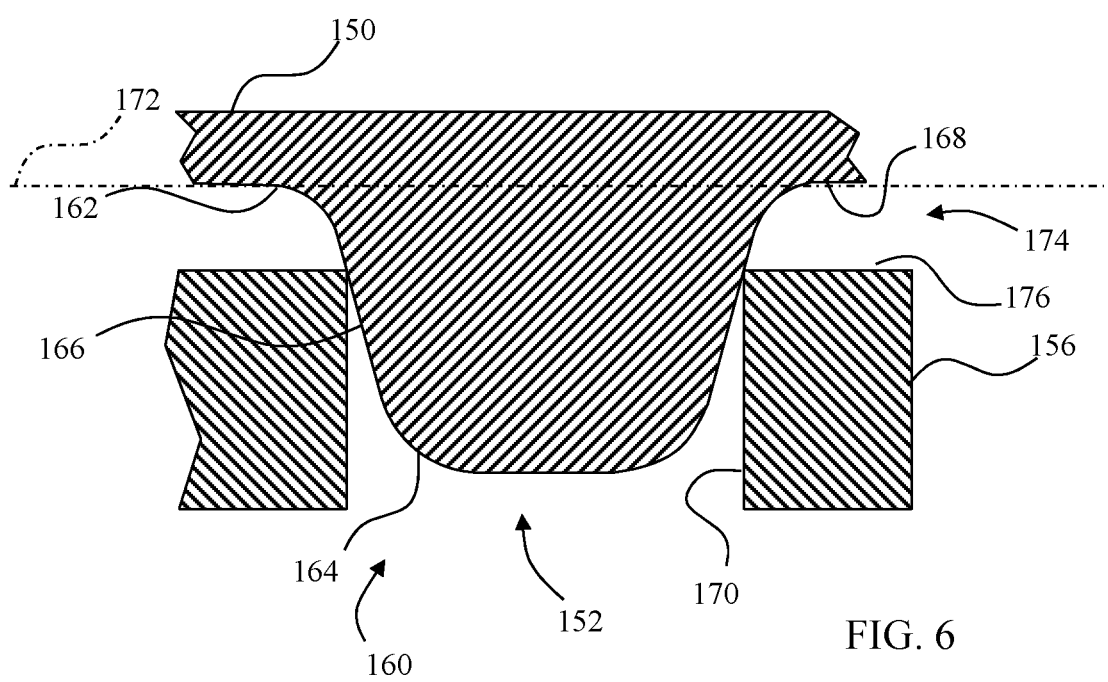
FIG. 6 depicts a partial side cross-sectional view of a mounting pin of the oscillating power tool of FIG. 1 contacting the wall of a receptacle of the accessory of FIG. 5.

The mounting pins 152 and the receptacles 160 are configured to allow a significantly lower required force when mounting an accessory compared to mounting arrangements which rely upon surface friction to lock the accessory in place. With reference to FIG. 6, the mounting pin 152 includes an upper transition portion 162, a lower transition portion 164, and a mounting wall portion 166 which extends between the upper and lower transition portions. The upper transition portion 162 extends between the lower surface 168 of the flange 150 and the mounting wall portion 166. In some embodiments, the upper transition portion is a straight surface angled into the lower surface 168 rather than curved as shown. The lower transition portion 164 extends between the mounting wall portion 166 and the bottommost portion of the mounting pin 152.

As depicted in FIG. 6, the mounting wall portion 166 of the mounting pin 152 is in contact with the upper portion of the wall 170 of the receptacle 160. In some embodiments, the wall is configured to contact the mounting pin at a location below the rim of the receptacle. While in some embodiments the wall 170 has curved corners, the wall includes angled corners in other embodiments. The wall 170 is angled with respect to a plane 172 defined by the lower surface 168 of the flange 150. In some embodiments, the wall is further angled within the receptacle to provide a pinching location below the surface of the receptacle.

A "pinching location" is described with reference to FIG. 6. In the embodiment of FIG. 6, the mounting pin 152 is depicted as contacting the wall 170 on two opposing sides of the mounting pin 152. It is not necessary, however, for both sides of the mounting pin 152 to contact the wall 170. So long as there are other mounting pins contacting respective receptacle walls with opposing orientations the accessory can be sufficiently stabilized. The salient feature is that the mounting pins, jointly or individually, are "pinched" between two opposing walls when an accessory is mounted. Alternatively, the accessory could be described as being "wedged" into the mounting pins.

In any event, when mounting force is applied to the accessory 154, the mounting force is applied directly from the wall 170 to the mounting pin 152. The term "mounting force" as used herein is a force applied directly from the accessory to a mounting pin when a clamping mechanism applies a force to the accessory. Forces resulting from the oscillation of the blade are not "mounting forces". Likewise, forces applied directly from the accessory to the flange (i.e., forces which do not pass through the mounting pins) are not mounting forces.

In the embodiment of FIG. 6, application of mounting force is accomplished by a configuration which results in a visual gap 174 between the upper surface 176 of the mounting portion and the lower surface 168 of the flange 150. Accordingly, the upper surface 176 is substantially parallel to the plane 172. This configuration provides the advantage of reduced requirements for precision in manufacturing the mounting pins and the receptacles. In some embodiments, the gap is eliminated by using close manufacturing tolerances.

Figure 7:
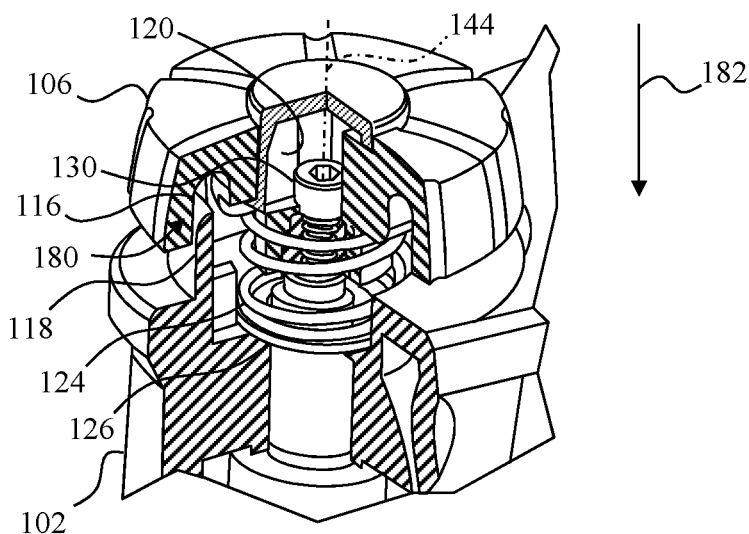
FIG. 7 depicts a partial top perspective cutaway view of the knob of the oscillating power tool of FIG. 1 with the knob positioned proximally on a threaded extension of the spindle.

Mounting of an accessory to the oscillating power tool 100 is accomplished by ensuring that the knob 106 has been fully rotated in the counterclockwise direction as depicted in FIG. 7. In this position (also depicted in FIG. 8), the lower surface of the central chamber 120 abuts the screw 130 which precludes separating the knob 106 from the externally threaded extension 112 (shown most clearly in FIG. 8).

Continuing with FIG. 7, when no external pressure is applied to the knob 106, the spring 124 pushes the knob 106 away from the housing 102 resulting in a gap 180 between the uppermost surface of the channel 116 and the uppermost surface of the annular protuberance 118. A user then presses downwardly on the top of the knob 106 in the direction of the arrow 182. The downward force compresses the spring 124 and the knob 106 moves along the axis 144 toward the housing 102 until the uppermost surface of the channel 116 is proximate the annular protuberance 118. In embodiments without the channel 116 and the annular protuberance 118, a lower surface of the knob 106 is moved to a location proximate the housing 102. The resulting configuration of the oscillating power tool 100 is depicted in FIG. 8.

Figure 8:
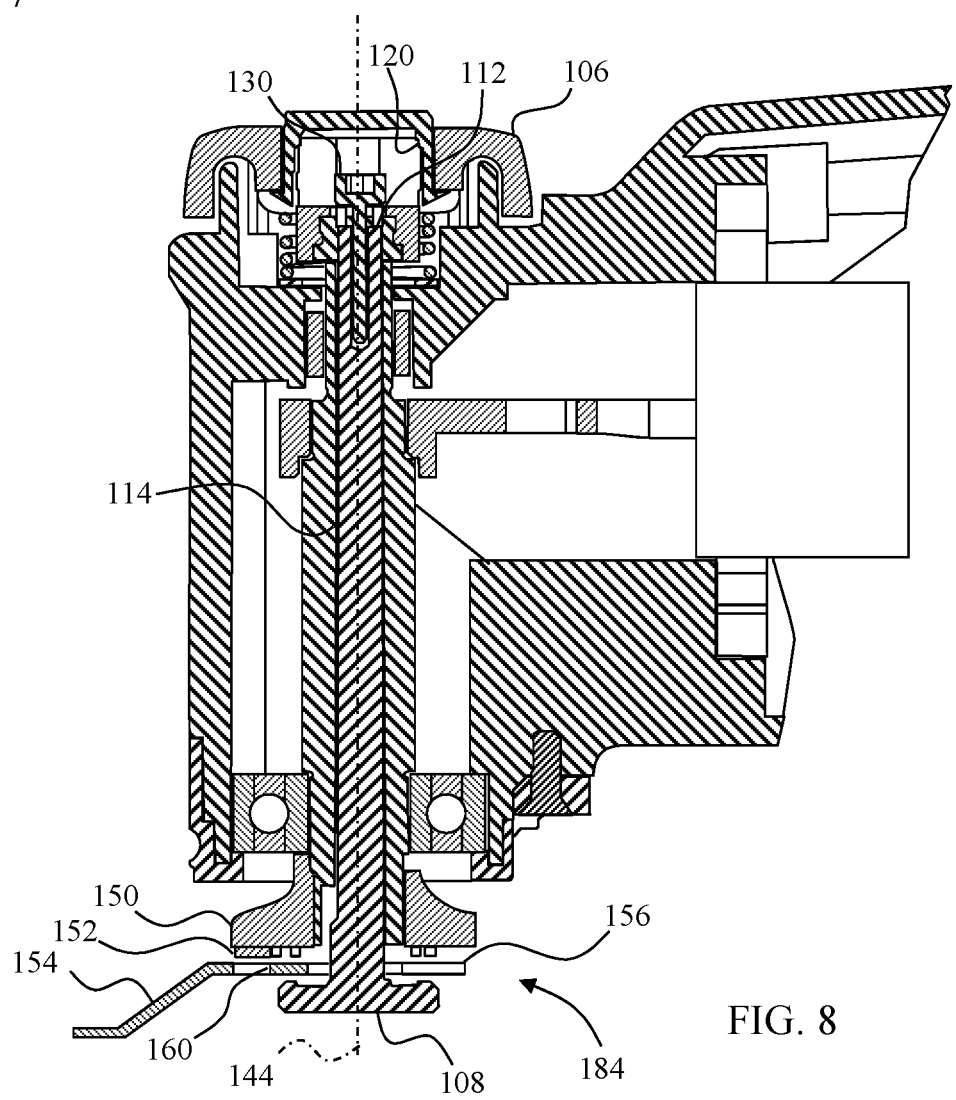
FIG. 8 depicts a partial side cross-sectional view of the oscillating power tool of FIG. 1 with the knob depressed while positioned proximally on the threaded extension of the spindle.

As depicted in FIG. 8, the downward movement of the knob 106 forces the spindle 114 to move downwardly while the output power shaft 132 remains stationary creating a gap 184 between the foot 108 and the flange 150. The length of the spindle 114 and the width of the gap 180 are configured such that the gap 184 is greater than the combination of the width of the accessory 154 and the height of the mounting pins 152. Accordingly, the mounting portion 156 of the accessory 154 can be inserted between the flange 150 and the foot 108 and the receptacles 160 can be aligned with the mounting pins 152.

Figure 9:
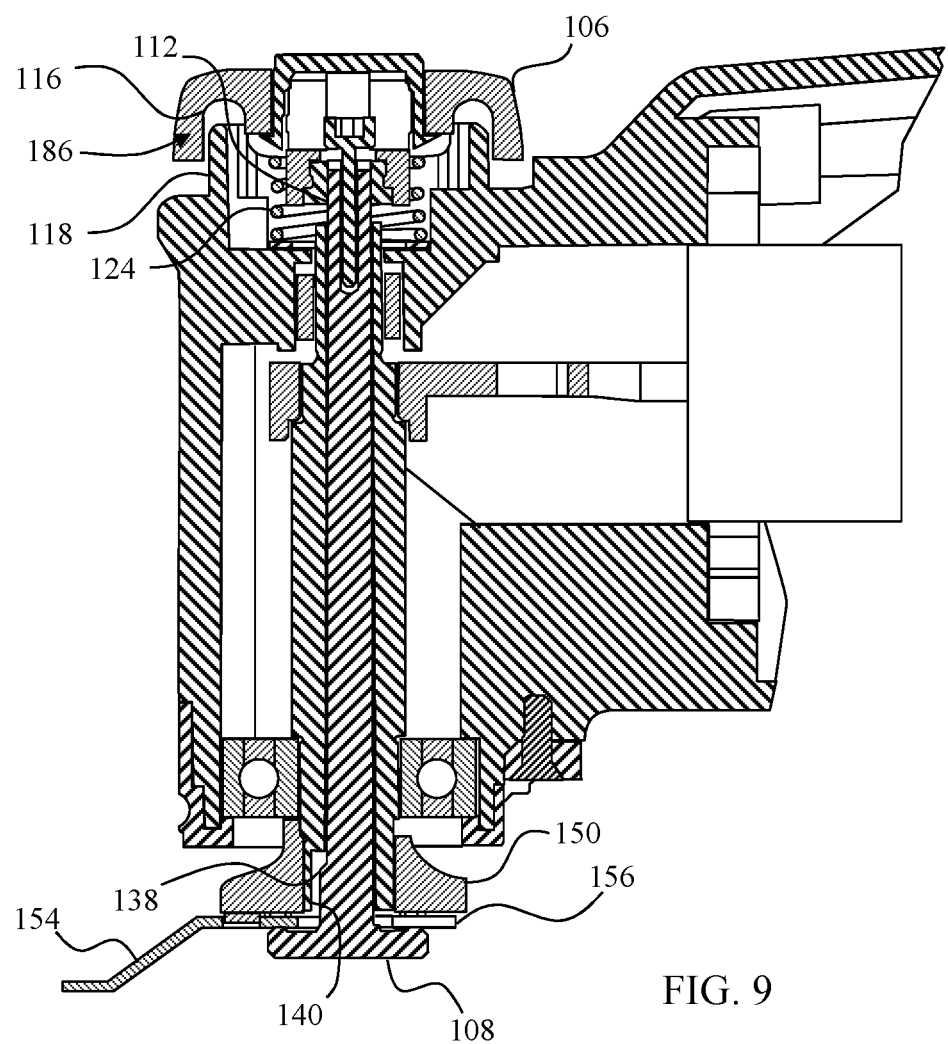
FIG. 9 depicts a partial side cross-sectional view of the oscillating power tool of FIG. 1 with the knob released while positioned proximally on the threaded extension of the spindle so as to clamp the accessory to the flange.

Once the receptacles 160 are aligned with the mounting pins 152, the user releases the downward force on the knob 106 which allows the spring 124 to force the knob 106, and thus the foot 108, upwardly along the axis 144. The foot 108 forces the accessory 154 upwardly into contact with the mounting pins 152 as depicted in FIG. 9. The spring 124 thus applies a force on the accessory 154 which results in the application of a mounting force on the mounting pins 152 by the walls of the receptacles 160 (see FIG. 6). The knob 106, the spring 124, the spindle 114 and the foot 108 are thus components of a clamping mechanism for the oscillating power tool 100.

While the spring 124 generates some amount force, the force generated solely by the spring 124 when the knob 106 is in the proximal position of FIG. 7 is typically not sufficient to allow for operation of the oscillating power tool 100 without slippage of the accessory on the mounting pins 152. This is because there is a tradeoff between the difficulty in forcing the spring downwardly to allow for positioning of the accessory and the amount of force the spring alone will exert on the accessory once mounted. Accordingly, in the embodiment of FIG. 9 the oscillating power tool 100 is configured such that when the spring alone generates force which results in a mounting force, a gap 186 remains between the upper surface of the channel 116 and the upper surface of the annular protuberance 118 (or between a lower surface of the knob and the housing). The gap 186 allows for additional mounting force to be applied to the mounting pins 152.

Specifically, the gap 186 allows the user to rotate the knob 106 in a clockwise direction (direction is based upon the perspective of FIG. 7). Because the anti-rotation protuberance 138 is positioned in the anti-rotation channel 140, the spindle 114 is not allowed to rotate. Accordingly, rotation of the knob 106 in the clockwise direction forces the knob 106 in a direction toward the foot 108 further compressing the spring 124. This increases the force applied by the foot 108 to the accessory 154, thereby increasing the mounting force.

Rotation of the knob 106 in one embodiment continues until the threaded metallic insert 110 contacts an upper surface of the output power shaft 132 (see FIG. 2) at which time the amount of clamping force increases rapidly.

In some embodiments, the upper surface of the annular protuberance 118 contacts the upper surface of the channel 116 (see FIG. 2) at which time the amount of clamping force increases rapidly. The upper surface of the annular protuberance 118 thus acts as a thrust bearing for the clamping mechanism.

In some embodiments, the washer 126 functions as a thrust bearing and the knob does not contact the housing directly. Travel of the knob 106 is limited in these embodiments such as by full compression of the spring 124 or by limiting the threading of the externally threaded extension 112.

In the disclosed embodiments the knob 106 will oscillate with the output power shaft 132. Because the knob 106 oscillates with the output power shaft 132, the annular protuberance 118 and the upper surface of the channel 116 are configured to exhibit a low friction interface. Alternatively, the interface between the spring 124 and the washer 126 is configured as a low friction interface in embodiments wherein the washer 126 functions as a thrust bearing. Additionally, the outer surface of the knob 106 is configured to exhibit a low profile to avoid snagging of items such as clothing while providing grip features to allow rotation of the knob 106 by hand.

In embodiments incorporating other types of components in the clamping mechanism a protective cover or hosing may be provided. By way of example, in embodiments which use a flip lever rather than a knob to further compress the spring 124, the lever may be configured to flip into a housing with a shape similar to the knob 106 during operation of the oscillating power tool 100. Alternatively, a cover may be provided which is positioned over the lever to prevent snagging when the oscillating power tool 100 is operated.

Moreover, while the mounting pins 152 exhibit a generally ovoid shape, mounting pins of other shapes can be used in conjunction with the oscillating power tool disclosed herein. Such shapes include rectangles, stars, circles, etc. Additionally, the mounting portion of the accessory may include closed or open shapes which complement at least some of the mounting pins. By way of example, U.S. Pat. No. 9,073,195 which issued Jul. 7, 2015 discloses a number of mounting pin and mounting portion configurations which can be configured to provide a "pinch" connection. The salient feature is that the mounting pin, either alone or in conjunction with another mounting pin, provides a configuration wherein the mounting portion of an accessory can "pinch" or wedge between the mounting pin or pins so that mounting force is applied to the mounting pins.

The disclosed arrangement allows for a substantial reduction in the amount of force required to prevent slippage of the accessory with respect to the flange when the tool is in use as compared to systems which rely upon forcing a planar portion of an accessory against a planar portion of a flange. Thus, regardless of the type of clamping mechanism used, a clamping mechanism incorporating the mounting pin configuration disclosed herein requires a lesser force which means that smaller, lighter, and simpler components can be used without incurring slippage between the accessory and the oscillating power tool.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An oscillating power tool system, comprising:
   a motor;
   an output power shaft extending along an axis and operably connected to the motor, the output power shaft driven in an oscillatory manner by the motor about the axis;
   a flange supported by the output power shaft and fixedly positioned with respect to the output power shaft so as to oscillate with the output power shaft when driven by the motor, the flange including a lower surface defining a first plane;
   a plurality of mounting pins extending from the flange to a location beneath the first plane, the plurality of mounting pins configured such that when an accessory is mounted to the flange, a mounting force is applied directly to the plurality of mounting pins from the accessory at a plurality of locations spaced apart from the first plane; and
   a clamping mechanism including
      a spindle axially slideably positioned within a central bore of the output power shaft and rotationally fixed with the output power shaft;
      a foot portion extending orthogonally to the axis and configured to clamp the accessory against the plurality of mounting pins when the accessory is mounted to the flange; and
      a spring operably connected to the spindle, wherein the spring is configured to selectively force the foot portion against the accessory when the accessory is mounted to the flange.

2. The oscillating power tool system of claim 1, wherein:
   the plurality of mounting pins comprise a first mounting pin;
   the first mounting pin includes at least one mounting wall portion extending between an upper transition portion and a lower transition portion;
   at least a portion of the first mounting pin extends within a receptacle of the accessory when the accessory is mounted to the flange; and
   the first mounting pin is configured such that the at least one mounting wall portion contacts a wall of the receptacle of the accessory when the accessory is mounted to the flange.

3. The oscillating power tool system of claim 2, wherein:
the at least one mounting wall portion comprises a first mounting wall portion on a first side of the first mounting pin;
the at least one mounting wall portion comprises a second mounting wall portion on a second side of the first mounting pin;
the first side is directly opposite the second side;
the first side contacts a first portion of the wall of the receptacle of the accessory when the accessory is mounted to the flange; and
the second side contacts a second portion of the wall of the receptacle of the accessory when the accessory is mounted to the flange.

4. The oscillating power tool system of claim 3, wherein the oscillating power system further comprises:
the accessory.

5. The oscillating power tool system of claim 1, wherein:
the spindle includes an externally threaded extension extending upwardly and outwardly from the central bore; and
the clamping mechanism includes an internally threaded portion threadedly engaged with the externally threaded extension, the clamping mechanism configured to apply an upward force on the spindle along the axis so as to force the foot against the accessory when the accessory is mounted to the flange.

6. The oscillating power tool system of claim 5, wherein:
the internally threaded portion is a portion of a knob;
the knob is movable between a first position with respect to the spindle and a second position with respect to the spindle;
the knob is spaced apart from the foot by a first distance when the knob is in the first position;
the knob is spaced apart from the foot by a second distance when the knob is in the second position; and
the second distance is greater than the first distance.

7. The oscillating power system of claim 6, wherein:
the spring is configured to bias the knob in a direction away from the foot.

8. The oscillating power tool system of claim 7, wherein the power tool system is configured such that when the knob is in the second position, the knob can be forced downwardly along the axis while in the second position, thereby moving the foot away from the flange.

9. The oscillating power tool system of claim 8, wherein:
the internally threaded portion is a metal insert;
the metal insert contacts the output power shaft when the knob is in the first position; and
the metal insert does not contact the output power shaft when the knob is in the second position and the knob is not being forced downwardly.

10. The oscillating power tool system of claim 9, wherein:
the plurality of mounting pins comprise a first mounting pin;
the first mounting pin includes at least one mounting wall portion extending between an upper transition portion and a lower transition portion;
at least a portion of the first mounting pin extends within a receptacle of the accessory when the accessory is mounted to the flange; and
the first mounting pin is configured such that the at least one mounting wall portion contacts a wall of the receptacle of the accessory when the accessory is mounted to the flange.

11. The oscillating power tool system of claim 10, wherein:
the at least one mounting wall portion comprises a first mounting wall portion on a first side of the first mounting pin;
the at least one mounting wall portion comprises a second mounting wall portion on a second side of the first mounting pin;
the first side is directly opposite the second side;
the first side contacts a first portion of the wall of the receptacle of the accessory when the accessory is mounted to the flange; and
the second side contacts a second portion of the wall of the receptacle of the accessory when the accessory is mounted to the flange.

12. The oscillating power tool system of claim 11, wherein the oscillating power system further comprises:
the accessory.

13. The oscillating power tool system of claim 1, wherein the plurality of mounting pins are configured such that when the accessory is mounted to the flange, a gap is formed between the lower surface and the plurality of locations spaced apart from the first plane when only the mounting force is applied directly to the plurality of mounting pins from the accessory.

14. The oscillating power tool system of claim 1, wherein:
the axis is a vertical axis;
the motor is above the flange;
the plurality of mounting pins each include a respective upper transition portion;
each of the respective upper transition portions is positioned directly above a planar portion of the accessory when the accessory is mounted to the flange.

\* \* \* \* \*